US011962811B2

United States Patent
Izadi et al.

(10) Patent No.: US 11,962,811 B2
(45) Date of Patent: Apr. 16, 2024

(54) SALIENCY BASED DENOISING

(71) Applicant: GOOGLE LLC, Mountain View, CA (US)

(72) Inventors: Mohammad Izadi, San Jose, CA (US); Yeping Su, Palo Alto, CA (US); Jeremy Dorfman, Burlington, MA (US)

(73) Assignee: GOOGLE LLC, Mountain View, CA (US)

( * ) Notice: Subject to any disclaimer, the term of this patent is extended or adjusted under 35 U.S.C. 154(b) by 121 days.

(21) Appl. No.: 17/504,886

(22) Filed: Oct. 19, 2021

(65) Prior Publication Data
US 2023/0120553 A1 Apr. 20, 2023

(51) Int. Cl.
*H04N 19/85* (2014.01)
*G06T 5/00* (2006.01)

(52) U.S. Cl.
CPC ............ *H04N 19/85* (2014.11); *G06T 5/002* (2013.01); *G06T 2207/20021* (2013.01); *G06T 2207/20064* (2013.01)

(58) Field of Classification Search
None
See application file for complete search history.

(56) References Cited

U.S. PATENT DOCUMENTS

| 9,025,880 | B2* | 5/2015 | Perazzi | G06V 10/758 |
| | | | | 382/190 |
| 10,313,692 | B2* | 6/2019 | Liu | H04N 19/167 |
| 10,652,552 | B1* | 5/2020 | Young | H04N 19/86 |
| 11,677,948 | B2* | 6/2023 | Besenbruch | H04N 19/91 |
| | | | | 375/240.03 |
| 2015/0169982 | A1* | 6/2015 | Perry | G06T 7/0002 |
| | | | | 382/195 |
| 2018/0182072 | A1* | 6/2018 | Mora | G06T 7/136 |
| 2018/0240221 | A1* | 8/2018 | Rijnders | G06V 10/431 |

FOREIGN PATENT DOCUMENTS

WO  WO-2008091483 A2 *  7/2008  ............. H04N 19/14

OTHER PUBLICATIONS

Yu, et al. "Image compression based on visual saliency at individual scales." International Symposium on Visual Computing 2009 (Year: 2009).*
Rapantzikos, Konstantinos, Yannis Avrithis, and Stefanos Kollias. "salienShrink: Saliency-Based Wavelet Shrinkage." 2007 IEEE International Conference on Image Processing. vol. 1. IEEE, 2007.
(Continued)

*Primary Examiner* — Tyler W. Sullivan
(74) *Attorney, Agent, or Firm* — Young Basile Hanlon & MacFarlane, P.C.

(57) ABSTRACT

Image denoising includes obtaining a saliency map for an image. The saliency map includes respective saliency scores for pixels of the image. Respective noise levels are assigned to the pixels using the respective saliency scores to obtain a noise level map. The image is denoised using the noise level map to obtain a denoised image. The denoised image is output, such as to a display or a storage device.

20 Claims, 10 Drawing Sheets

(56) References Cited

OTHER PUBLICATIONS

Liu, Zhi, Zhang, Xiang, Luo, Shuhua, and Le Meur, Olivier, "Superpixel-Based Spatiotemporal Saliency Detection", IEEE Transactions on Circuits and Systems for Video Technology, Sep. 2014, pp. 1522-1540.
Achanta, Radhakrishna, Appu Shaji, Kevin Smith, Aurelien Lucchi, Pascal Fua, and Sabine Süsstrunk. Slic superpixels. No. REP_WORK. 2010.
J. Zhang and S. Sclaroff, "Saliency Detection: A Boolean Map Approach," 2013 IEEE International Conference on Computer Vision, Sydney, NSW, 2013, pp. 153-160, doi: 10.1109/ICCV.2013.26.
C. Guo and L. Zhang, "A Novel Multiresolution Spatiotemporal Saliency Detection Model and Its Applications in Image and Video Compression," in IEEE Transactions on Image Processing, vol. 19, No. 1, pp. 185-198, Jan. 2010, doi: 10.1109/TIP.2009.2030969.
T. Mauthner, H. Possegger, G. Waltner and H. Bischof, "Encoding based saliency detection for videos and images," 2015 IEEE Conference on Computer Vision and Pattern Recognition (CVPR), Boston, MA, 2015, pp. 2494-2502, doi: 10.1109/CVPR.2015.7298864.
R. Achanta, A. Shaji, K. Smith, A. Lucchi, P. Fua, and S. Süsstrunk, "SLIC superpixels compared to state-of-the-art superpixel methods," IEEE Trans. Pattern Anal. Mach. Intell., vol. 34, No. 11, pp. 2274-2282, Nov. 2012.
Zhao, Haohua, and Liqing Zhang. "Sparse coding image denoising based on saliency map weight." International Conference on Neural Information Processing. Springer, Berlin, Heidelberg, 2011.

\* cited by examiner

SALIENCY BASED DENOISING

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using efficient noise reduction coding.

SUMMARY

This application relates generally to encoding and decoding of image data, video stream data, or both, for transmission or storage. Disclosed herein are aspects of systems, methods, and apparatuses for processing image data (e.g., before encoding and decoding) by denoising an image based on a saliency map.

A first aspect is a method for image denoising. The method includes obtaining a saliency map for an image, where the saliency map includes respective saliency scores for pixels of the image; assigning respective noise levels to the pixels using the respective saliency scores to obtain a noise level map; denoising the image using the noise level map to obtain a denoised image; and outputting the denoised image.

A second aspect is a device for image denoising. The device includes a processor configured to obtain a saliency map for an image, where the saliency map includes respective saliency scores for pixels of the image; assign respective noise levels to the pixels using the respective saliency scores to obtain a noise level map; denoise the image using the noise level map to obtain a denoised image; and output the denoised image.

A third aspect is a non-transitory computer readable medium storing instructions operable to cause one or more processors to perform operations for image denoising. The operations include obtaining a saliency map for an image, where the saliency map includes respective saliency scores for pixels of the image; assigning respective noise levels to the pixels using the respective saliency scores to obtain a noise level map; denoising the image using the noise level map to obtain a denoised image; and outputting the denoised image.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

FIG. 8A shows dimensions of subbands of the two-dimensional wavelet coefficients resulting from two-dimensional wavelet decomposition of the input image using the filter bank of FIG. 7, while FIG. 8B shows the two-dimensional wavelet transform coefficients that form the subbands of FIG. 8A.

DETAILED DESCRIPTION

Figure 1:
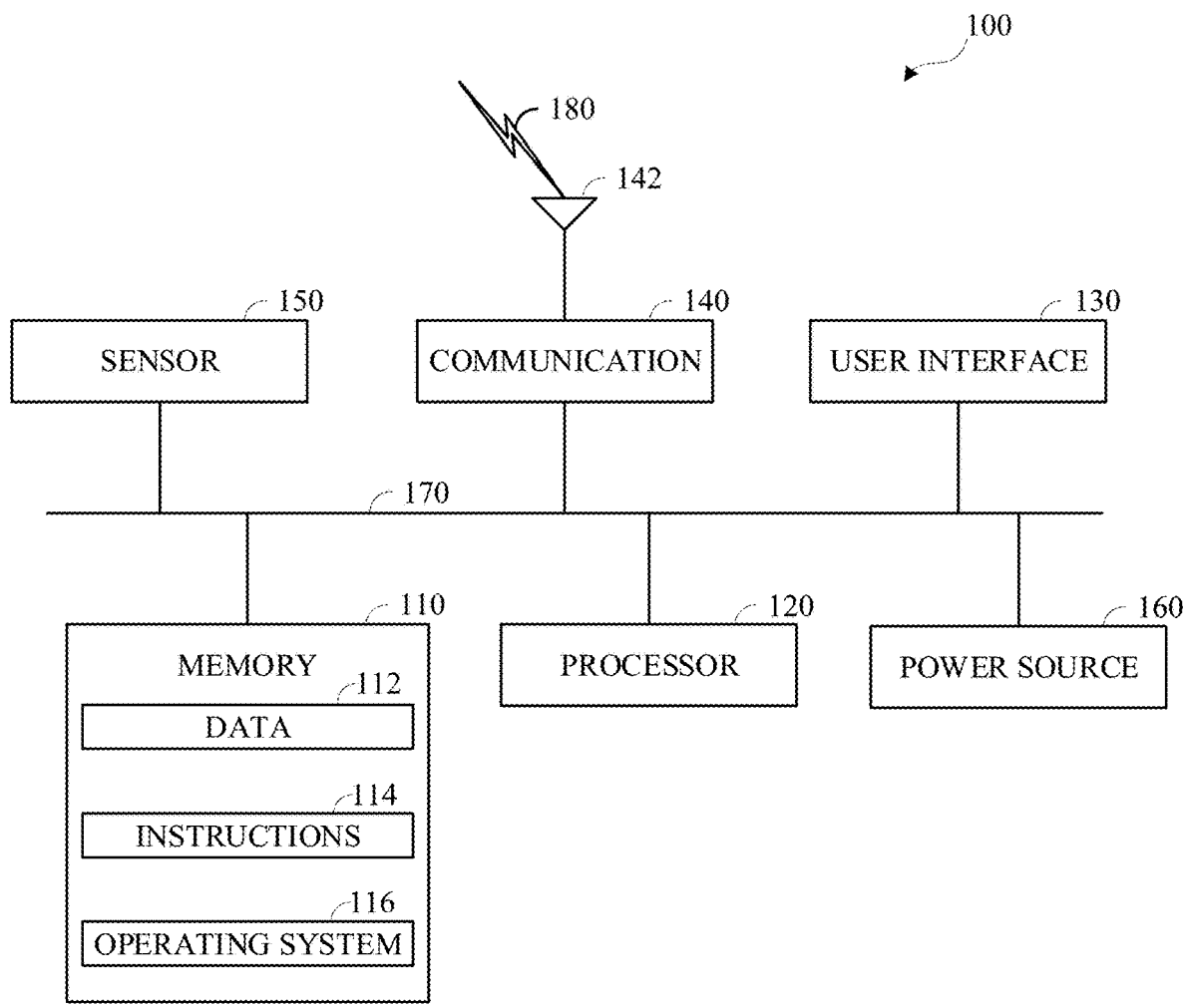
FIG. 1 is a diagram of a computing device in accordance with implementations of this disclosure.

Image and video compression schemes may include dividing an image, or frame, into smaller portions, such as blocks, and generating an output bitstream using techniques to limit the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to recreate the blocks and the source images from the limited information.

Input images, such as single images or video frames, may include input noise. Input noise may degrade the visual quality of videos and may reduce coding efficiency, such as by utilizing bandwidth for encoding noise information and reducing the accuracy and efficiency of coding. Input noise can also reduce visual quality. The input noise may include, for example, ambient thermal noise, noise caused by defects of video acquisition pipeline, such as sensor defects, lens defects, image signal processing defects, or a combination thereof, or any other input noise.

Denoising an image before coding may improve the efficiency and accuracy of coding. Further, the visual quality of the image once decoded may be improved. Additionally or alternatively, denoising an image after coding may remove noise or artefacts introduced by the encoding and/or transmission process and improve the visual quality of the decoded image. However, difficulties exist in denoising. The noise characteristics may be unknown (e.g., there is no access to a reference) such that denoising cannot be tailored to the expected noise. Further, and even when some knowledge of the noise to be expected exists, it may be difficult to determine the noise characteristics. For example, noise statistics may be time-varying, have non-stationary distributions, or both. As another example, different noise types may occur in different portions of an image or frame, and over time across frames in a video sequence.

As a result of these difficulties, techniques for denoising may be complex, resulting in a high computational load (e.g., central processing unit) consumption, a lengthy time period for processing each image, or both. Further, previous efforts to implement denoising have resulted in either under- or over-denoising images due to unknown noise characteristics, leading to low image quality or reduced bitrate savings.

Additionally, traditional denoising techniques may uniformly remove noise throughout an image. The traditional denoising techniques may over-denoise the whole image and remove texture and details from foreground and salient regions, leading to low image quality. The traditional denoising techniques may under-denoise the whole image, which leads to a loss in bitrate savings.

The present disclosure describes using saliency information in denoising images. The human visual system focuses on salient or important regions when perceiving images while paying less attention to background objects. The relative saliency information of regions (e.g., groups of pixels) of an image can be indicative of the levels of attention paid to those regions. More salient regions can be under-denoised or denoised more carefully, if at all, than less salient regions so that the details (e.g., texture) of these more salient regions remain visible or are unchanged (or are little changed) due to the denoising. The less salient regions can be over-denoised and smoothed out for higher bitrate saving since the human visual system does not focus on them. As such, the relative saliency of pixels can be used to determine the amount of denoising to perform on the pixels or groups of pixels.

The techniques described herein obtain a saliency map for an image. The saliency map includes saliency scores for the pixels and/or superpixels (i.e., groups of pixels) of the image. The saliency map indicates the relative perceptual importance of regions of the image. The saliency map is then used to obtain a noise level map that determines (e.g., sets, chooses, etc.) the amount of the noise to be removed from each region of the image therewith preserving the quality of salient regions. The image is then denoised according to the noise level map.

As such, the saliency information can be used to improve compression performance and decoded image quality. For example, the saliency information can be used to boost the quality of more salient regions. For example, the saliency score of each pixel can be used to determine the amount of denoising to perform on the pixel where less bitrate can be used for non-important regions of the image (i.e., regions with lower saliency scores) such as by over-denoising such regions. For example, the saliency map can be used to determine (e.g., set, select, etc.) encoding parameters. For example, lower bitrates (e.g., larger quantization parameter values) can be used for non-important image regions (e.g., regions with lower saliency scores). Denoising using saliency information can result in better compression performance while preserving (e.g., improving) the subjective quality of the decoded images. The improved compression performance can in turn result in reduced network bandwidth consumption, such as in streaming applications.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can capture an image such as the image of a user operating the computing device. Although a single sensor 150 is shown, the computing device 100 may include a number of sensors 150. For example, the computing device 100 may include a first camera oriented in a first direction, such as with a field of view directed toward a user of the computing device 100, and a second camera oriented in another direction, such as with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170. Although a single bus 170 is shown in FIG. 1, a computing device 100 may include multiple buses.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
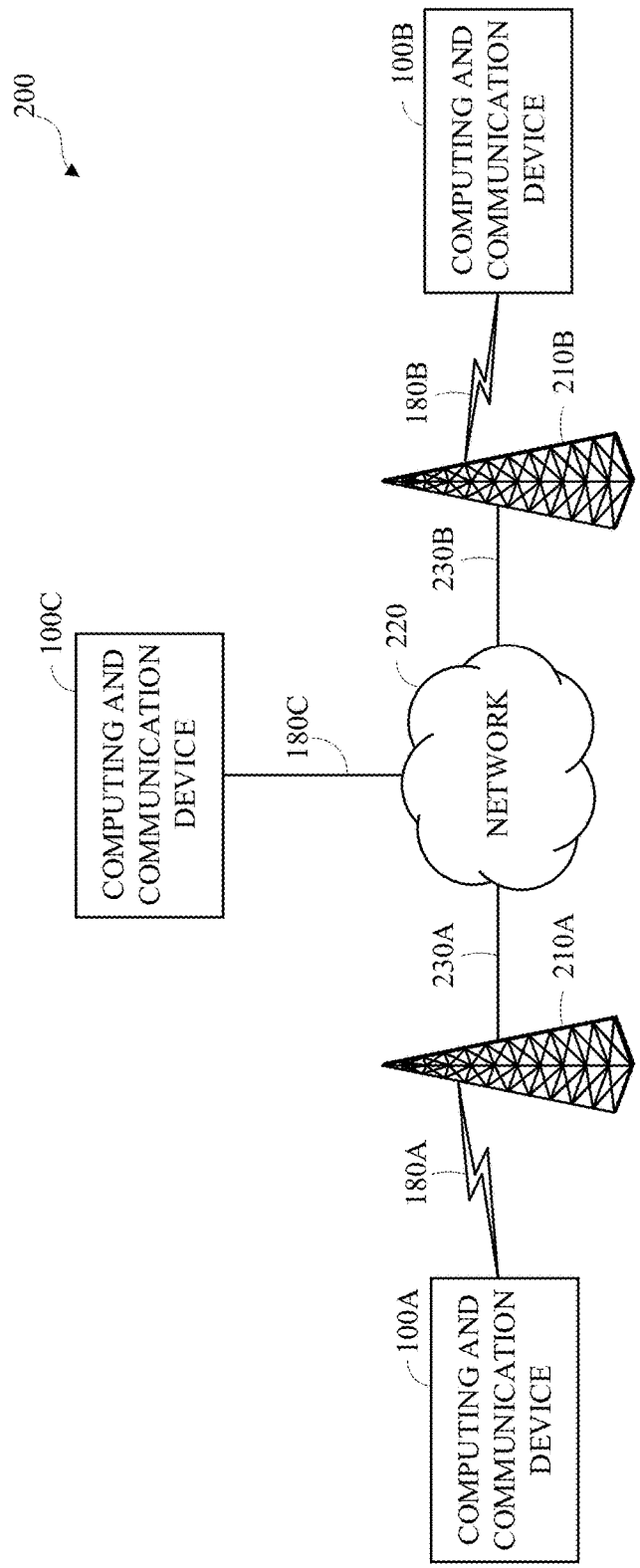
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via a wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper-Text Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
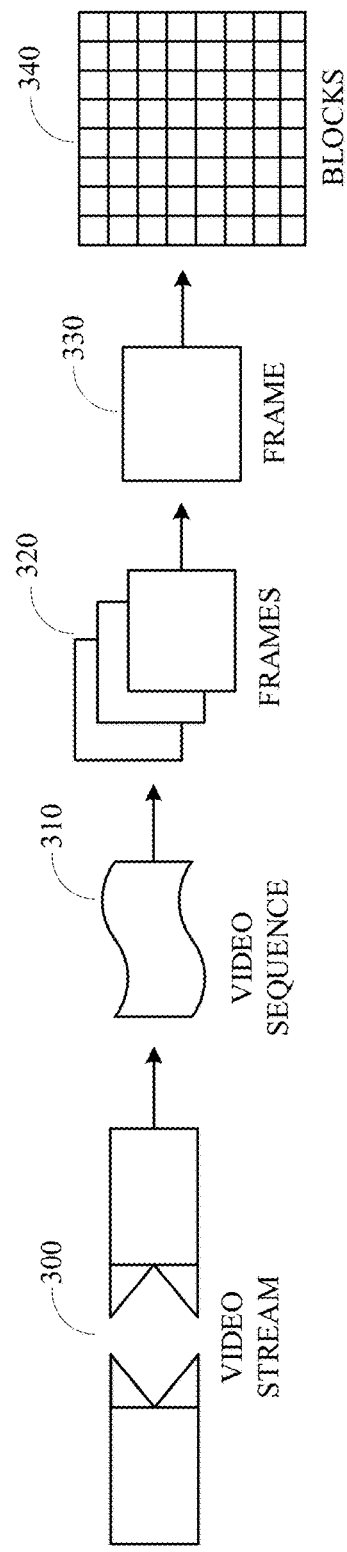
FIG. 3 is a diagram of a video stream that may provide image data to be processed in accordance with implementations of this disclosure.

FIG. 3 is a diagram of a video stream 300 that may provide image data to be processed in accordance with implementations of this disclosure. The video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. An image, a frame, a block, a pixel, or a combination thereof can include display information, such as luminance information, chrominance information, or any other information that can be used to store, modify, communicate, or display the video stream or a portion thereof.

Figure 4:
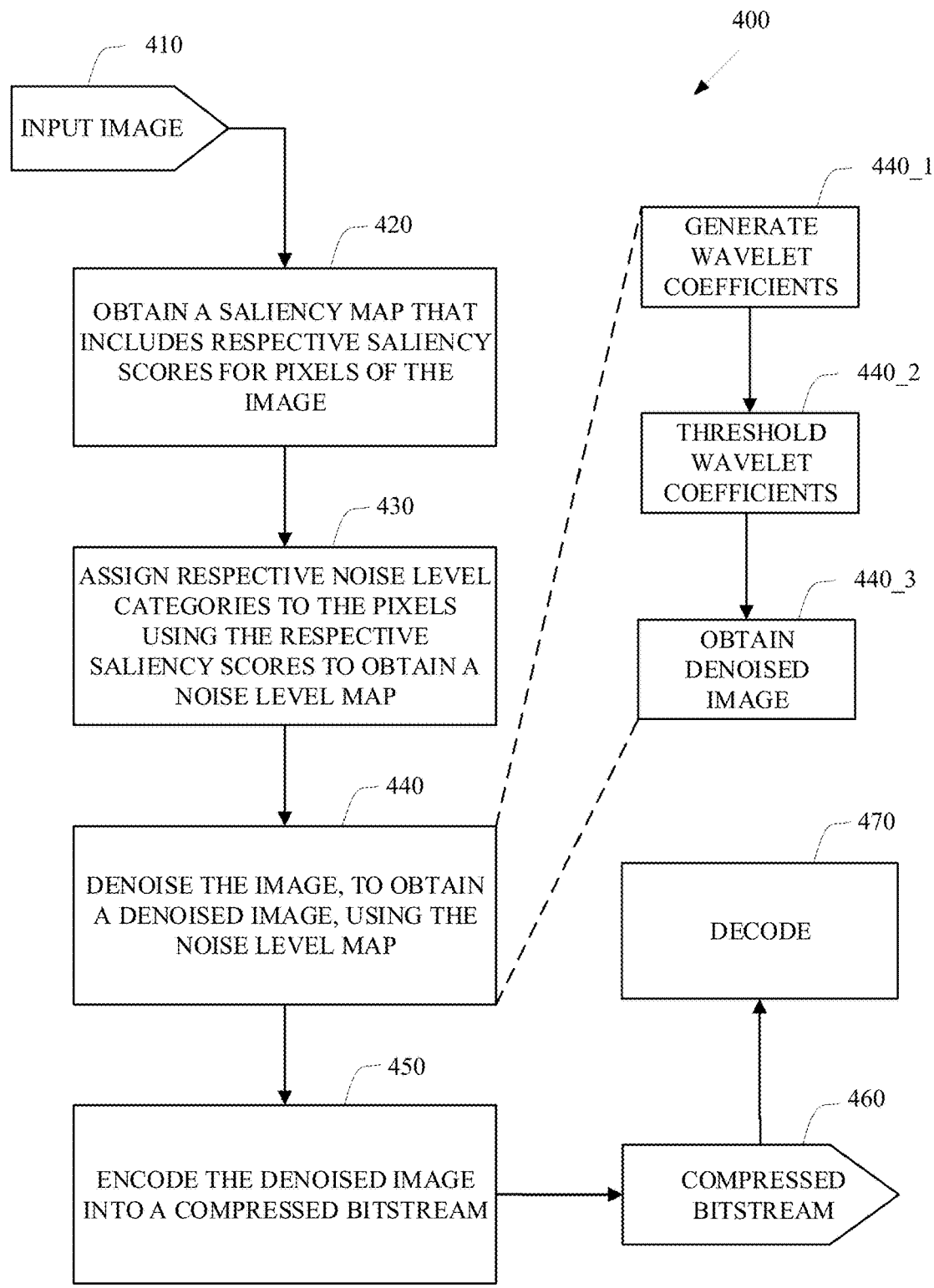
FIG. 4 is a flowchart diagram of an example of a technique of processing image data for noise reduction in accordance with implementations of this disclosure.

FIG. 4 is a flowchart diagram of an example of a technique 400 of processing image data for noise reduction in accordance with implementations of this disclosure. The technique 400 can be implemented in a device, such as the computing device 100 shown in FIG. 1 or the computing and communication devices 100A, 100B, 100C shown in FIG. 2. In some implementations, the technique 400 may be implemented by a computer software program stored in a data storage unit, such as the memory 110 shown in FIG. 1. The computer software program can include machine instructions that may be executed by a processor, such as the processor 120 shown in FIG. 1, and may cause the device to process image data as described herein. In some implementations, the technique 400 may be implemented by specialized hardware described below, or by a combination of such specialized hardware and software.

The technique 400 may include obtaining or receiving an input image 410, which input image includes the image data to be processed. In the examples of the technique 400 described herein, a single image is processed. However, the teachings herein apply equally to single input images, and to input images that form respective frames of a video sequence, such as an uncompressed input, or source, video frame. For example, the processor executing or performing the technique 400, such as the processor 120, may receive, or otherwise access, an input image or input video stream or signal, or a portion thereof, such as the video stream 300, and may identify a frame as the input image. The input image may be received at a frame buffer and be buffered before the technique 400 advances to further process the image.

The input image is in the spatial (e.g., pixel) domain. The input image may comprise more than one layer or plane of data. For example, where the input image is in red-green-blue (RGB) format, each layer of data represents the pixel values forming the image in a respective color plane. Where the input image is in luminance-chrominance (e.g., YUV) format, each of three layers of data represents the pixel values forming the image in the luminance and two chrominance planes, respectively. The particular format of the input image is not limited, and any color format, resolution, etc., may be used. When the input image comprises multiple planes or layers of data, each layer may be denoised separately, or fewer than all layers may be denoised. For example, when the input image is in the YUV format, the denoising steps of the technique 400 may be performed on only the image data of the luminance plane Y.

At 420, a saliency map is obtained for the input image 410. The saliency map includes respective saliency scores for pixels of the image. For example, the saliency map can include a respective saliency score for each pixel of the image. The saliency scores can be normalized to 1. That is, each of saliency scores can be in the range of [0, 1].

Any number of techniques can be used to obtain the saliency map. The saliency map can be a spatial saliency map where, for example, the relative pixel intensities indicate areas of the input that have more salient properties or have more visual importance than others. The saliency map can be a temporal saliency map where, for example, temporal saliency can be measured using temporal gradient differences between a current image and a preceding or a succeeding image in a video sequence. In an example, the saliency map can be a spatiotemporal saliency map that combines pixel spatial saliency scores and pixel temporal saliency score to obtain pixel saliency scores for each pixel of the image.

In an example, the techniques described in Liu, Zhi, Zhang, Xiang, Luo, Shuhua, and Le Meur, Olivier, "Superpixel-Based Spatiotemporal Saliency Detection", IEEE Transactions On Circuits And Systems For Video Technology, September 2014, pp. 1522-1540, can be used and are briefly described below. In the description herein, a spatial salience is obtained. However, as already mentioned, the disclosure is not so limited and any type of saliency map can be obtained including a temporal or a spatiotemporal saliency map.

The saliency map (i.e., a spatial saliency map herein) can be obtained by (a) converting the image to the LAB color space in which the luminance channel and two chrominance channels are separated; (b) segmenting the pixels of the image into superpixels; (c) calculating a global contrast map that includes a respective global contrast measure for each superpixel; (d) calculating a spatial sparsity map that includes a respective spatial sparsity measure of each superpixel; (e) calculating, by performing a superpixel-wise multiplication operation between the global contrast measure and spatial sparsity measure, a super-pixel spatial saliency map that includes a spatial saliency measure for each superpixel; and (f) obtaining a pixel-level saliency map (i.e., the "saliency map"). These steps are further described below.

The input image 410 is first converted to the Lab color space. The Lab color space can be useful in identifying or obtaining measures of similarities or differences between pixel colors. The Lab color space can be used to obtain Euclidean distances between colors of pixels. As further described below, colors of superpixels are compared in the process of obtaining the saliency map.

The image can then be segmented into the superpixels using a Simple Linear Iterative Clustering (SLIC) algorithm. Any SLIC variant can be used. In its original form, the SLIC algorithm is a k-means clustering performed on the image pixels. Superpixels can be obtained by clustering pixels of the input image 410 based on their color similarity and proximity in the image plane. In an example, the size of a superpixel can be set to 200 pixels; however, other superpixel sizes (in pixels) are possible.

A superpixel is a group of pixels that share common characteristics. Superpixels can carry more information than the respective individual pixels of the superpixels and can have perceptual meaning since pixels belonging to a given superpixel share similar visual properties. Superpixels can provide a convenient and compact representation of images. Saliency detection on the basis of superpixels can be more performant than saliency detection on the basis of individual pixels. As pixels of a superpixel are likely to belong to the same image object, superpixels can also preserve object boundaries in the saliency map. The superpixels are used, as further described herein, to extract superpixel-level color histograms.

Figure 5:
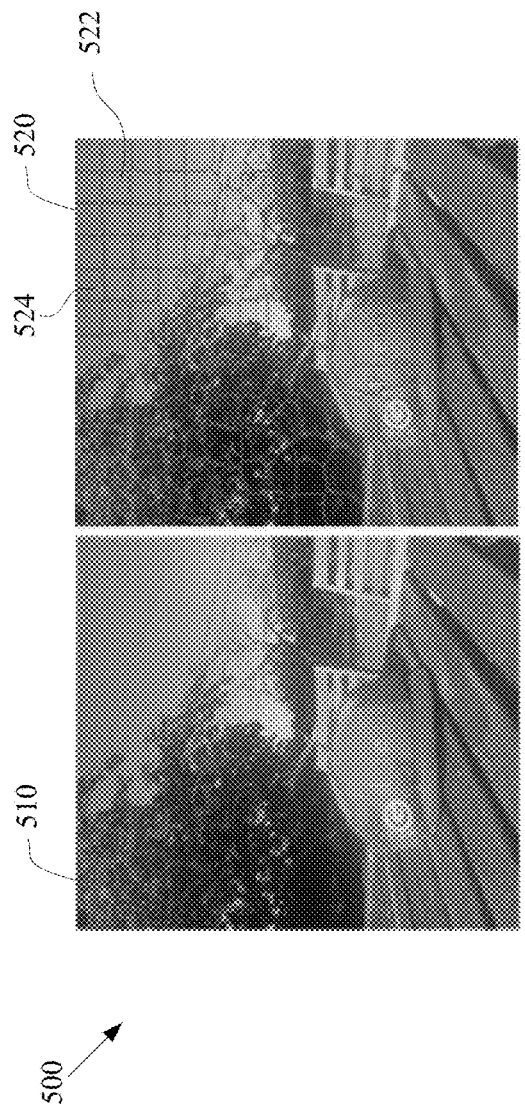
FIG. 5 is an example of superpixels obtained according to implementations of this disclosure.

The input image 410 is partitioned into a set of n superpixels $sp_t^i$, where i=1, ..., n. The subscript t in $sp_t^i$ indicates a current image (e.g., the input image 410) of a video sequence and can be useful when a temporal saliency map (not described herein) is obtained. FIG. 5 illustrates an example of superpixels obtained according to implementations of this disclosure. An image 510 is segmented into superpixels, such as superpixels 522 and 524, as shown in a superpixel segmentation 520. The pixels of a superpixel are shown in the superpixel segmentation 520 as being enclosed within a boundary. However, the boundaries shown are for illustration purposes only to clarify the extent of each superpixel.

Returning to FIG. 4, local color histograms (i.e., super-pixel-level histograms $CH_t^i$, for i=1, . . . , n) and a global color histogram (i.e., an image-level histogram $CH_t^0$) are obtained next. It is noted that while denoising is described with respect to an image as a whole, the disclosure is not so limited. For example, the techniques described herein can be used to denoise a block or a group of blocks (e.g., titles, segments) at a time. For example, instead of obtaining the global color histogram $CH_t^0$ for the whole image, the global color histogram $CH_t^0$ can be obtained for the block or the group of blocks, as the case may be.

The colors of each color channel are uniformly quantized into $q_b$ bins. As such, a color quantization table $q_c$ can be obtained with $q_c = q_b * q_b * q_b$ bins (i.e., entries), where $q_b$ can be 4, 8, 16, or some other value. However, as larger values of $q_b$ (e.g., $q_b=16$) can increase computational complexity, it is preferable to use a smaller value for $q_b$ (e.g., $q_b=4$ or 8). To illustrate, assume that the luminance values range from 0 to 255, $q_b$ is 16, and the bins are numbered 0-15, where a bin i would include the pixel values in the range $[i*q_b, (i+1)*q_b-1]$. As such, a pixel value m can be mapped to (e.g., counted in, included in, etc.) bin number rounddown(m/16). It is noted that the color channels need not be quantized into the same number of $q_b$ bins.

The global contrast map and the spatial sparsity map can now be obtained.

For each superpixel $sp_t^i$, the respective superpixel-level color histogram $CH_t^i$ is obtained (e.g., calculated, etc.) using only the pixels of the superpixel $sp_t^i$. The values (i.e., pixel counts) of the superpixel-level color histogram $CH_t^i$ can be normalized so that they add up to 1

$$\left(\text{i.e., } \sum\nolimits_{k=1}^{qc} CH_t^i(k) = 1\right).$$

An image-level color histogram $CH_t^0$ is also calculated. The image-level color histogram $CH_t^0$ is calculated using all the pixels of input image 410. The values of the image-level color histogram $CH_t^0$ can be normalized so that they add up to 1

$$\left(\text{i.e., } \sum\nolimits_{k=1}^{qc} CH_t^0(k) = 1\right).$$

A quantized color can be associated with each bin, $qc_t(k)$, of the image-level color histogram $CH_t^0$. The quantized color of a bin $qc_t(k)$ can be calculated as the mean color of the pixels that fall into that bin of the image-level color histogram $CH_t^0$.

The global contrast measure $S_{GC}(sp_t^i)$ for each superpixel $sp_t^i$ can now be calculated by comparing the superpixel-level color histogram $CH_t^i$ with the image-level color histogram $CH_t^0$. The contrast between the image-level color histogram $CH_t^0$ and the superpixel-level color histogram $CH_t^i$ of a super-pixel $sp_t^i$ is calculated, using equation (1), as a sum of distances between the different quantized colors weighted by their occurrence probabilities (e.g., the probability of a randomly selected pixel of the input image 410 having a specific quantized color value). The set of all of the global contrast measures $S_{GC}(sp_t^i)$ of all of the super-pixels, $sp_t^i$ for i=1, . . . , n, is referred to as the global contrast map.

$$S_{GC}(sp_t^i) = \sum\nolimits_{j=1}^{qc} \left[ CH_t^i(j) \sum\nolimits_{k=1}^{qc} \|qc_t(j) - qc_t(k)\|_2 \cdot CH_t^0(k) \right] \quad (1)$$

To illustrate the concept of the global contrast measure $S_{GC}$, assume that the image includes a face of a person standing in the middle of a forest or on a large piece of green land. As such, the image background is largely comprised of the color green; and a superpixel on the face of the person has a contrast against the whole green background. The global contrast measure is a measure of such color contrast for each of the super pixels of the whole image.

A spatial sparsity measure $S_{SS}(sp_t^i)$ for each superpixel $sp_t^i$ can now be calculated using equation (4). The spatial sparsity measure is based on the assumption that the spatial distribution of the colors of more salient objects (e.g., foreground) is sparser than that of the colors of less salient object (e.g., background). Lesser salient colors can be assumed to scatter over the image. The calculations required before using the equation (4) are now described.

First, an intra-image similarity $\lambda_{intra}(sp_t^i, sp_t^j)$ between each pair of superpixels $sp_t^i$ and $sp_t^j$ is calculated according to equation (2). As can be appreciated from equation (2), the intra image similarity $\lambda_{intra}$ is higher when the color distributions of that pair of superpixels are similar and the spatial distance between them is shorter.

$$\lambda_{intra}(sp_t^i, sp_t^j) = \sum\nolimits_{k=1}^{qc} \sqrt{CH_t^i(k) \cdot CH_t^j(k)} \cdot \left[ 1 - \frac{\|\mu_t^i - \mu_t^j\|_2}{d} \right] \quad (2)$$

In equation (2), $\mu_t^i$ and $\lambda_t^j$ are the spatial centers (i.e., Cartesian coordinates) of the superpixels $sp_t^i$ and $sp_t^j$, respectively; d is the diagonal length of the input image 410; and the term $$\sum\nolimits_{k=1}^{qc} \sqrt{CH_t^i(k) \cdot CH_t^j(k)}$$

is the Bhattacharyya coefficient between the corresponding superpixel-level color histograms.

Second, a spatial spread SD ($sp_t^i$) of the superpixel $sp_t^i$ is now calculated using equation (3), where D ($sp_t^j$) is the Euclidean distance from the spatial center of the superpixel $sp_t^j$ to the spatial center of the input image 410. The spatial spread SD ($sp_t^i$) is a measure of the spatial distribution, in the whole of the input image 410, of the different colors of the superpixel-level color histogram $CH_t^i$.

$$SD(sp_t^i) = \frac{\sum_{j=1}^{n} \lambda_{intra}(sp_t^i, sp_t^j) \cdot D(sp_t^j)}{\sum_{j=1}^{n} \lambda_{intra}(sp_t^i, sp_t^j)} \quad (3)$$

An inverse normalization operation can be performed on the spatial spread measures $SD(sp_t^i)$, according to equation (4) to obtain the spatial sparsity measure for each superpixel. The inverse normalization operation is performed due to the assumption that the spatial distribution of salient object colors is sparser than background colors. The set of all of the spatial sparsity measures $S_{SS}(sp_t^i)$ of the super-pixels $sp_t^i$ for i=1, ..., n is referred to as the spatial sparsity map.

$$S_{SS}(sp_t^i) = \frac{\max[SD(sp_t)] - SD(sp_t^i)}{\max[SD(sp_t)] - \min[SD(sp_t)]} \quad (4)$$

The spatial saliency measure for each superpixel $sp_t^i$ is calculated using equation (5). The spatial saliency measure for the superpixel $sp_t^i$ is obtained by multiplying the global contrast measure $S_{GC}(sp_t^i)$ of the superpixel $sp_t^i$ by the spatial sparsity measure $S_{SS}(sp_t^i)$ of the superpixel $sp_t^i$. The set of all of the spatial saliency measure $S_s(sp_t^i)$ of the super-pixels $sp_t^i$ for i=1, ..., n is referred to herein as the super-pixel spatial saliency map.

$$S_s(sp_t^i) = S_{GC}(sp_t^i) \cdot S_{SS}(sp_t^i) \quad (5)$$

The pixel-level spatial saliency measure $S_S(p_t^i)$ for a pixel $p_t^i$ can now be obtained using equation (6), where $N(p_t^i)$ is the local neighborhood of the pixel $p_t^i$ and $\text{bin}(p_t^i)$ is the entry number for the quantized color of the pixel $p_t^i$ in the color quantization table. The neighborhood of the pixel $p_t^i$ can be defined as the set of superpixels that includes the superpixel $p_t^i$ and its adjacent superpixels. The collection of all of the pixel-level spatial saliency measures $S_S(p_t^i)$ of the super-pixels $sp_t^i$ for i=1, ..., n is referred herein as the saliency map.

$$S_S(p_t^i) = \frac{\sum_{sp_t^j \in N(p_t^i)} S_S(sp_t^j) \cdot CH_t^j[\text{bin}(p_t^i)]}{\sum_{sp_t^j \in N(p_t^i)} CH_t^j[\text{bin}(p_t^i)]} \quad (6)$$

Figure 6:
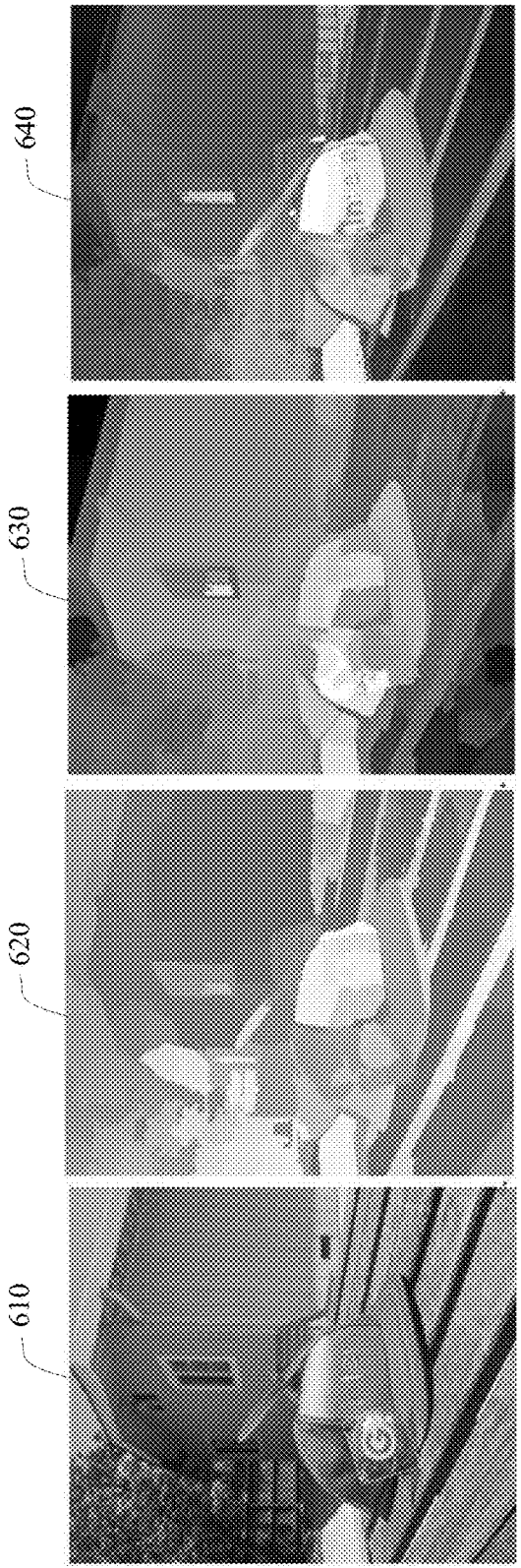
FIG. 6 is an example illustrating a global contrast map, a spatial sparsity maps, and a pixel-level spatial saliency map according to implementations of this disclosure.

FIG. 6 is an example 600 illustrating a global contrast map 620, a spatial sparsity map 630, and a pixel-level spatial saliency map 640 according to implementations of this disclosure, each of which are obtained for a source image 610, which can be the input image 410 of FIG. 4. The global contrast map 620 is obtained as described with respect to equation (1). The spatial sparsity map 630 is obtained as described with respect to equation (4). The pixel-level spatial saliency map 640 is obtained as described with respect to equation (5).

At 430 of FIG. 4, a noise level map is obtained. The noise level map is obtained by assigning respective noise level categories to the pixels of the input image 410 using the respective saliency scores. That is, the saliency map can be thought of as being converted into the amount of the noise that is to be removed from each region (e.g., sets of pixels) of the input image 410. The input image 410 is partitioned into regions where each region includes a set of pixels of the image such that all the pixels of the set are to be denoised using the same denoising parameters, as further described herein.

In an example, the values of the saliency map can be sorted, such as in ascending order from 0 to 1, and divided into a predetermined number of groups N. The lower the saliency score of a pixel, the more the pixel is in the background. Each of the groups can be thought of as corresponding to a depth value (e.g., depth location) within the input image 410. That is, using the saliency map, the pixels of the input image 410 can be assigned relative depth locations within the input image 410. The pixels at each depth location constitute or form a region. In an example, five (i.e., N=5) depth values are possible. The five depth values can be the semantic equivalents of foremost foreground, foreground, uncertain, background, and foremost background. The "uncertain" category can mean that a pixel having such a category cannot be categorized as either a foreground pixel or a background pixel. The values of the saliency map can be divided in any number of ways into the predetermined number of regions N.

In an example, the values of the saliency map can be evenly divided amongst the predetermined number of regions N. To illustrate, assume that the input image 410 has a size of P×Q. As such, the saliency map includes P*Q saliency scores. Evenly dividing the saliency scores amongst the predetermined number of regions N can mean that each region includes P*Q/N values of the saliency scores. The first $$\frac{1}{N}\%$$

of the sorted values of the saliency map can be assigned to the first region, the second $$\frac{1}{N}\%$$

of the sorted values of the saliency map can be assigned to the second region, ..., the $N^{th}$ $$\frac{1}{N}\%$$

of the sorted values of the saliency map can be assigned to the $N^{th}$ region. Such a grouping of the saliency map values results in a partition of the input image 410 that evenly divides the pixels of the input image 410 into the N regions based on the saliency scores of the pixels. This way, regardless of the distribution of the saliency scores, N regions that include the same number of saliency scores are obtained. As such, each group includes the same number of pixels.

In another example, the range of the saliency scores can be divided into N sub-ranges and the saliency scores in each sub-range can be assigned to the corresponding group. Assume that $\min_{SC}$ is the minimum saliency score of the saliency map and $\max_{SC}$ is the maximum saliency score of the saliency map. Thus, the range can be divided into sub-ranges where each such sub-range includes an interval= $(\max_{SC} - \min_{SC})/N$ of the values of the range $[\min_{SC}, \max_{SC}]$. Thus, the first group can include the saliency scores in the sub-range $[\min_{SC}, \min_{SC}+\text{interval})$, the second group can include the saliency scores in the sub-range $[\min_{SC}+\text{interval}, \min_{SC}+2*\text{interval})$, and so on.

The noise level map can be obtained by assigning a noise level to the pixels of the image based on the groupings. The assigned noise level is inversely related to the saliency score. That is, the higher the saliency score, the lower the noise level assigned to the pixels of the group and vice versa. Each of the groups of pixels can be associated with a noise level. A minimum noise level can be assigned to the pixels of the foremost foreground group and a maximum noise level can be assigned to the pixels of the foremost background group. For example, the noise levels associated with the input image 410 may be in the range of min_noise_level to max_noise_level. Each category i=1, ..., N can be associated with a noise level (min_noise_level+(i−1) *

$\Delta_{noise}$) that is to be removed from the pixels of the group. That is, the pixels of the $i^{th}$ group are denoised using the noise value (min_noise_level+(i−1)*$\Delta_{noise}$) noise is calculated as $\Delta_{noise}$=(max_noise_level−min_noise_level)/N. As such, the groups are associated, respectively, with the noise levels min_noise_level, min_noise_level+$\Delta_{noise}$, min_noise_level+2 $\Delta_{noise}$, min_noise_level+3$\Delta_{noise}$, . . . , and max_noise_level.

The minimum noise level (min_noise_level) and the maximum noise level (max_noise_level) values can be inputs to the technique 400. For example, the technique 400 can be configured to use predefined min_noise_level and max_noise_level values. The min_noise_level and max_noise_level values can be provided by a user. The predefined min_noise_level and max_noise_level can be empirically obtained. For example, denoising experiments of many images according to implementations of this disclosure and using different ranges of [min_noise_level, max_noise_level] can be performed to obtain the optimal min_noise_level and max_noise_level values that result in the optimal results over all the images. In an example, the optimality of results can be measured in terms of most optimal coding performance of the denoised images. In another example, noisy images may be obtained by adding random noise to source images. The noisy images may be denoised to obtain denoised images, which may then be encoded to obtain decoded images. As such, the optimality of results can be measured in terms of closeness of the denoised images to the respective source images and/or in terms of closeness of the decoded images to the respective source images. There can be different ways to measure closeness, such as Peak signal-to-noise ratio (PSNR), mean square error, sum of absolute differences error, or any other suitable error measure.

At 440 of FIG. 4, the input image 410 is denoised to obtain a denoised image. The noise level map is used to denoise pixels or blocks of the input image 410 such that the respective noise level for a pixel is removed from the pixel. Any denoising technique can be used including a Wavelet-based denoising technique, a Fast Fourier Transform (FFT) denoising technique, or any other denoising technique that can, or can be adapted to, denoise different regions of an image based on respective denoising parameters.

In an example, a two-dimensional wavelet denoiser can be used where the respective noise levels can be used as shrinkage thresholds for the pixels. That is, the values min_noise_level, min_noise_level+$\Delta_{noise}$, min_noise_level+2$\Delta_{noise}$, min_noise_level+3$\Delta_{noise}$, . . . , and max_noise_level can be the shrinkage thresholds. Using wavelets for denoising may also be referred to as noise reduction.

Wavelets provide for fast computation, which is particularly desirable in real-time applications, such as video streaming Wavelets provide for simultaneous time and frequency localization in contrast to Fourier transforms, for example, which have acceptable frequency localization but are a poor choice for time localization. Further, the basis for wavelets (e.g., scaling and translation) involves approximation coefficients, which intuitively represent low frequency components, and detail coefficients, which capture high frequency components. This basis allows the wavelet denoiser described herein to adapt to noise with varying characteristics, even when no information is available regarding the type of noise expected in an image or frame.

Wavelet denoising the input image 410, at 440, can include generating wavelet coefficients at 440_1, thresholding the wavelet coefficients at 440_2, and obtaining a denoised image at 440_3.

At 440_1, denoising begins with generating, for the input image 410 in the spatial domain, two-dimensional (2-D) wavelet coefficients at a plurality of levels. Each level of the plurality of levels may comprise multiple subbands in a wavelet domain. Each subband may be associated with a respective subband type in a wavelet domain.

Generating the 2-D wavelet coefficients can include performing 2-D wavelet decomposition with the input image providing a 2-D input signal. In an implementation, a discrete wavelet transform (DWT) is used for generating the 2-D wavelet coefficients. More specifically, the discrete function $f[n]$ is a weighted summation of wavelets $\psi[n]$, plus a coarse approximation (or scaling function) $\phi[n]$ as shown generally by equation (7) below.

$$f[n] = \frac{1}{\sqrt{M}} \sum_k W_\phi[j_0, k]\phi_{j_0,k}[n] + \frac{1}{\sqrt{M}} \sum_{j \geq j_0} \sum_k W_\psi[j, k]\psi_{j,k}[n] \quad (7)$$

In equation (7), M is the length of the input signal (here the 2-D input signal from the input image), n=0, 1, 2, . . . M, $\phi_{j,k}[n]=2^{j/2}\phi[2^jn−k]$, $\psi_{j,k}[n]=2^{j/2}\psi[2^jn−k]$, and $W_\phi$ and $W_\psi$ are the approximation and detail coefficients calculated based on the input signal, where $j_0$ is an arbitrary starting scale. In general, the approximation coefficients denote low pass components while detail coefficients denote high pass frequencies. The wavelets $\psi[n]$ and the coarse approximation $\phi[n]$ depend upon the characteristics of the wavelet family That is, the wavelets may comprise any family of orthogonal wavelets forming a DWT such as, but not limited to, a Haar wavelet transform or a Daubechies wavelet transform.

Generating the 2-D wavelet coefficients at the plurality of levels at 440_1 can include applying a Haar wavelet transform, also called a Haar transform, to the input image 410 in the spatial domain. The Haar transform can be used because it forms a relatively simple discrete wavelet filter. Generating the 2-D wavelet coefficients at the plurality of levels is illustrated initially with reference to FIGS. 7 and 8A-8B.

Figure 7:
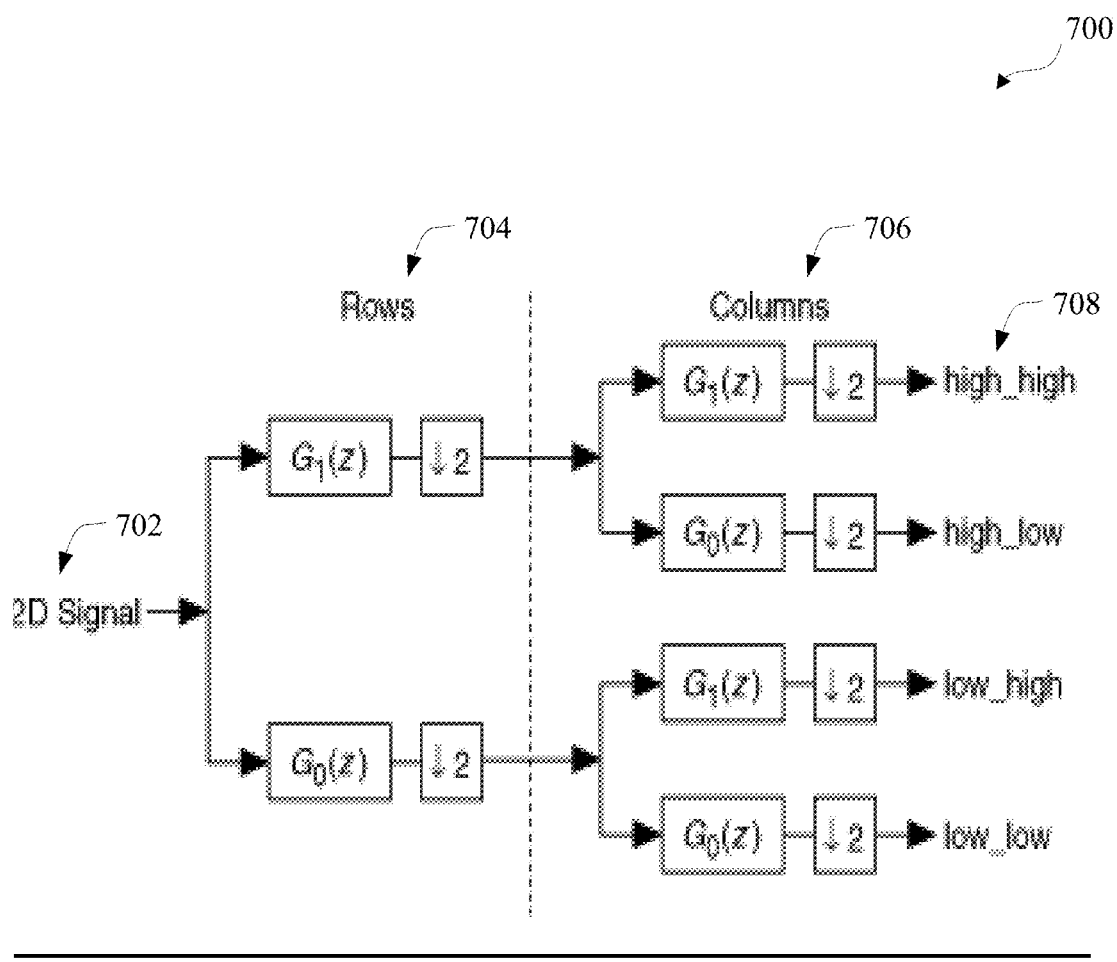
FIG. 7 is a block diagram of a filter bank that may be used for generating two-dimensional wavelet coefficients.

FIG. 7 is a block diagram of a filter bank 700 that may be used for generating the 2-D wavelet coefficients according to some implementations of the teachings herein. The filter bank 700 illustrates an example of a DWT that uses wavelets for multiresolution analysis. More specifically, a 2-D signal 702, such as the input image 410 or a layer thereof as described above, is input into the filter bank 700. The filter bank 700 comprises a plurality of separable wavelet filters $G_1(z)$ and $G_0(z)$, Haar transforms in this example, that are applied to the 2-D signal 702 in a recursive fashion, leading to a one-dimensional (1-D) convolution along rows 704 and columns 706 of the input image. In this example, 2-D wavelet coefficients at a level are generated for the 2-D input signal 702 in the spatial domain such that the level comprises multiple subbands in the wavelet domain. As shown, the level (i.e., the output of the filter bank 700) comprises four subbands 708 in the wavelet domain, where the four subbands 708 include a subband of a low-low (LL) subband type, a subband of a low-high (LH) subband type, a subband of a high-low (HL) subband type, and a subband of a high-high (HH) subband type. While four subbands 708 are shown in this example, this is not required. The multiple subbands can include at least two subbands.

Figure 8A:
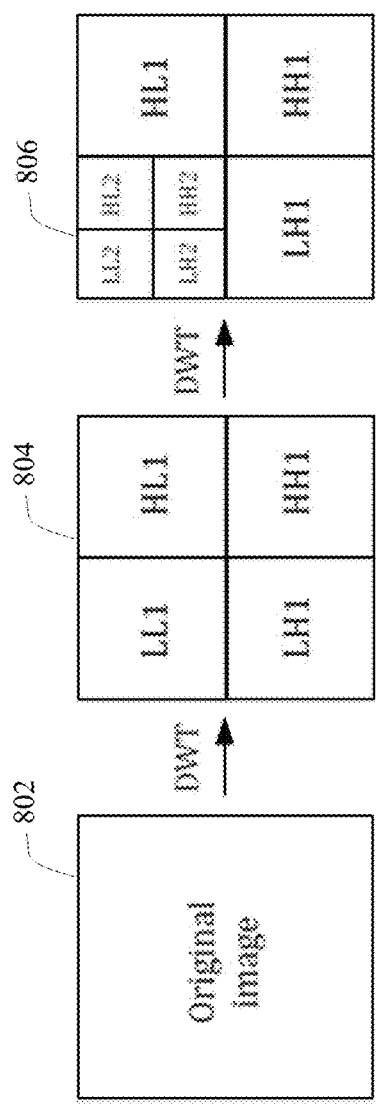
FIGS. 8A and 8B are diagrams illustrating generation of two-dimensional wavelet coefficients at a plurality of levels for image data.
Figure 8B:
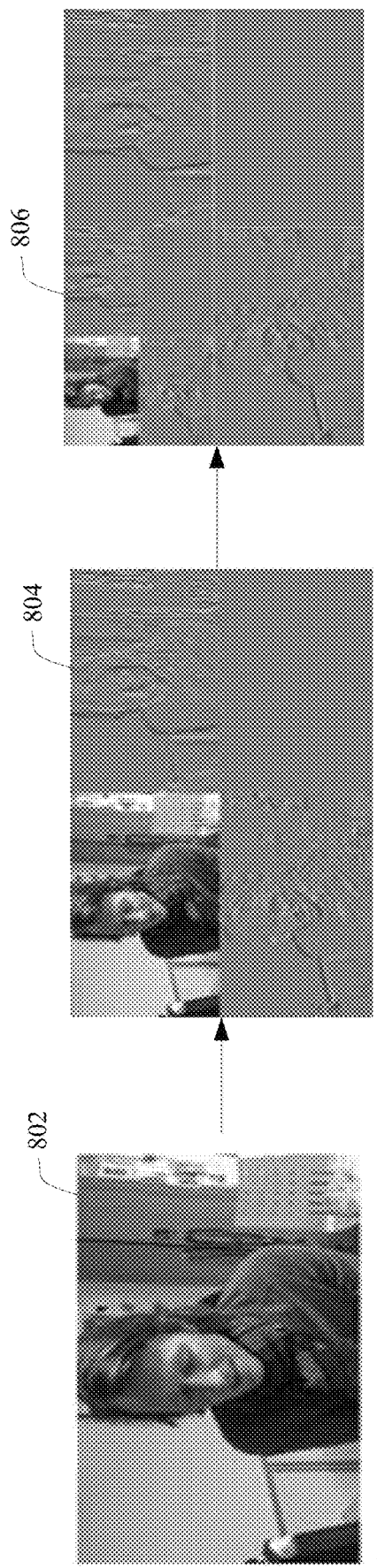

FIGS. 8A and 8B are diagrams illustrating generation of 2-D wavelet coefficients at a plurality of levels for image data, such as groups of pixels of an input image 802 that is in the spatial domain. FIG. 8A shows dimensions of subbands of the 2-D wavelet coefficients resulting from 2-D wavelet decomposition of the input image 802 using the filter bank 700 of FIG. 7, while FIG. 8B shows the 2-D wavelet transform coefficients that form the subbands of FIG. 8A.

The input image 802, which can be the input image 410 of FIG. 4, includes a grayscale image in the spatial domain. Applying a DWT, such as a Haar transform, to the input image 802 results in a first level 804 comprising multiple subbands in the wavelet domain Because this example uses the filter bank 700, the multiple subbands of the first level 804 include a first LL subband (LL1), a first LH subband (LH1), a first HL subband (HL1), and a first HH subband (HH1). The second level 806 results from applying the DWT to the 2-D wavelet coefficients of the first level 804. In this example, the 2-D wavelet coefficients of the first level 804 provide the input to the filter bank 700. The multiple subbands of the second level 806 include a second LL subband (LL2), a second LH subband (LH2), a second HL subband (HL2), and a second HH subband (HH2).

In viewing FIGS. 8A and 8B, it can be seen that the 2-D wavelet coefficients at the plurality of levels (here, two levels) comprise decimated 2-D wavelet coefficients. Referring back to FIG. 7, this occurs because the wavelet decomposition of a 2D signal 702, such as the input image 802, involves down-sampling after convolution with the wavelet filters $G_1(z)$ and $G_0(z)$. The 2-D wavelet coefficients generated at the plurality of levels at 440_1 of FIG. 4 instead may be undecimated 2-D wavelet coefficients. This may be achieved by applying undecimated wavelets to the input image at 440_1. In an implementation, instead of down-sampling the image data after every level, the filters may be up-sampled after every level by padding up zeros to increase the filter length. In this way, the 2-D wavelet coefficients are of the same image dimensions (or size) as the input image.

At 440_2, at least some of the 2-D waveform coefficients are thresholded according to the noise level map. In the noise level map, and as already mentioned, each pixel of the input image 410 is associated with a respective noise level (i.e., a shrinkage threshold). As such, a pixel at a Cartesian location (x, y) in the input image 410 corresponds to (e.g., is associated with) the noise level that is at the location (x, y) in the noise level map. The noise level (i.e., the shrinkage threshold) at the location (x, y) of the noise level map is used as a threshold for the wavelet coefficient corresponding to the location (x, y) in the plurality of levels. The thresholding of the wavelet coefficients may include soft thresholding, hard thresholding, or some other thresholding technique. As mentioned above, in some implementations, down-sampling may be performed after every level. In such implementations, the corresponding noise level map used at a down-sampled level can also be down-sampled accordingly.

Figure 11:
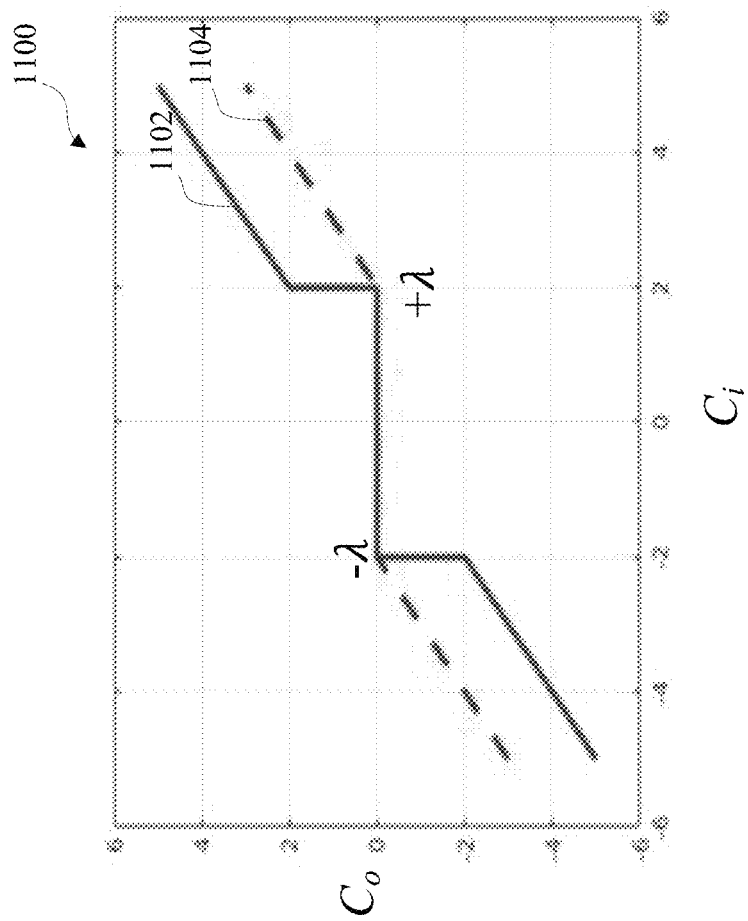
FIG. 11 is a graph comparing hard thresholding to soft thresholding.

A graph 1100 of FIG. 11 compares the output $\rho_T(C_i)$ of a hard threshold transfer function to the output $\rho_T(C_i)$ of a soft threshold transfer function for an input wavelet coefficient $C_i$. More specifically, a hard threshold transfer function is plotted at 1102, and a soft threshold transfer function is plotted at 1104. The input data includes, for example, wavelet coefficients of 2-D wavelet coefficients ($C_i$) for an image on the x-axis and output wavelet coefficients ($C_o$) on the y-axis resulting from each of hard and soft thresholding the input coefficient. In the graph 1100, $\lambda$ is the threshold value, which can be a value obtained from the noise level map.

In hard thresholding, if the input $C_i$ (e.g., the wavelet coefficient corresponding to the pixel at (x, y)) has a magnitude larger than the threshold $\lambda$ (e.g., the noise level of the noise level map associated with the pixel at (x, y)), then the wavelet coefficient is unmodified (i.e., $C_o = C_i$); otherwise, the coefficient is set to zero (i.e., $C_o = 0$). An example of a hard threshold transfer function is below, where, again, $C_i$ is a 2-D wavelet coefficient corresponding to a pixel (x, y), and $\lambda$ is the threshold (e.g., a noise level of the noise level map corresponding to the pixel (x, y)).

$$\rho_T(C_i) = \begin{cases} C_i, & |C_i| \geq \lambda \\ 0, & |C_i| < \lambda \end{cases}$$

In contrast, in soft thresholding, if the input $C_i$ is greater than or less than the threshold, the input $C_i$ is be reduced by or increased by the threshold value, respectively. An example of a soft threshold transfer function is below.

$$\rho_T(C_i) = \begin{cases} C_i - \lambda, & C_i \geq \lambda \\ C_i + \lambda, & C_i \leq \lambda \\ 0, & |C_i| < \lambda \end{cases}$$

After thresholding, at 440_3, the technique 400 generates a denoised image in the spatial domain using the plurality of levels (e.g., using the 2-D wavelet coefficients of each level, whether or not the coefficients belong to a subband that was thresholded). Generating the denoised image can include performing an inverse wavelet transform using each of the subband types of the levels after thresholding at 440_2. The inverse wavelet transform is the inverse of the wavelet transform used to generate the wavelet coefficients at 440_1.

In some implementations, the denoised image may be encoded at 450 to generate an encoded denoised image, either as a single image or as part of a sequence of images (e.g., frames) forming a video sequence. The denoised image may be encoded by an encoder. Any encoder may be used, whether the encoder is a lossless encoder or a lossy encoder. One example is in FIG. 9, which is a block diagram of an encoder 900 in accordance with implementations of this disclosure. The encoder can encode input image data, such as one or more denoised images generated at 440, to generate an encoded (compressed) bitstream 460. The compressed bitstream 460 may be decoded to reproduce one or more denoised images using a decoder at 470. One example of a decoder is in FIG. 10, which is a block diagram of decoder 1000 in accordance with implementations of this disclosure In some implementations, denoising an image as described herein can be performed at a decoder after decoding image data to obtain the image or portions (e.g., blocks) thereof. The denoising can be performed at the block level, at a group of blocks level, or at the image level. For example, after a block is decoded (as further described below with respect to the decoder 1000 of FIG. 10) to obtain a reconstructed block, a filtering step, which may be performed by a filtering stage of the decoder, may denoise the reconstructed block as described herein. In another example, a reconstructed image may be denoised as described herein. For example, prior to outputting or as part of outputting an image at 1014 of FIG. 10, the decoder 1000 can denoise the image as described herein. As such, denoising the input image 410 (i.e., a reconstructed image) can be performed by a decoder as a post-processing step.

Figure 9:
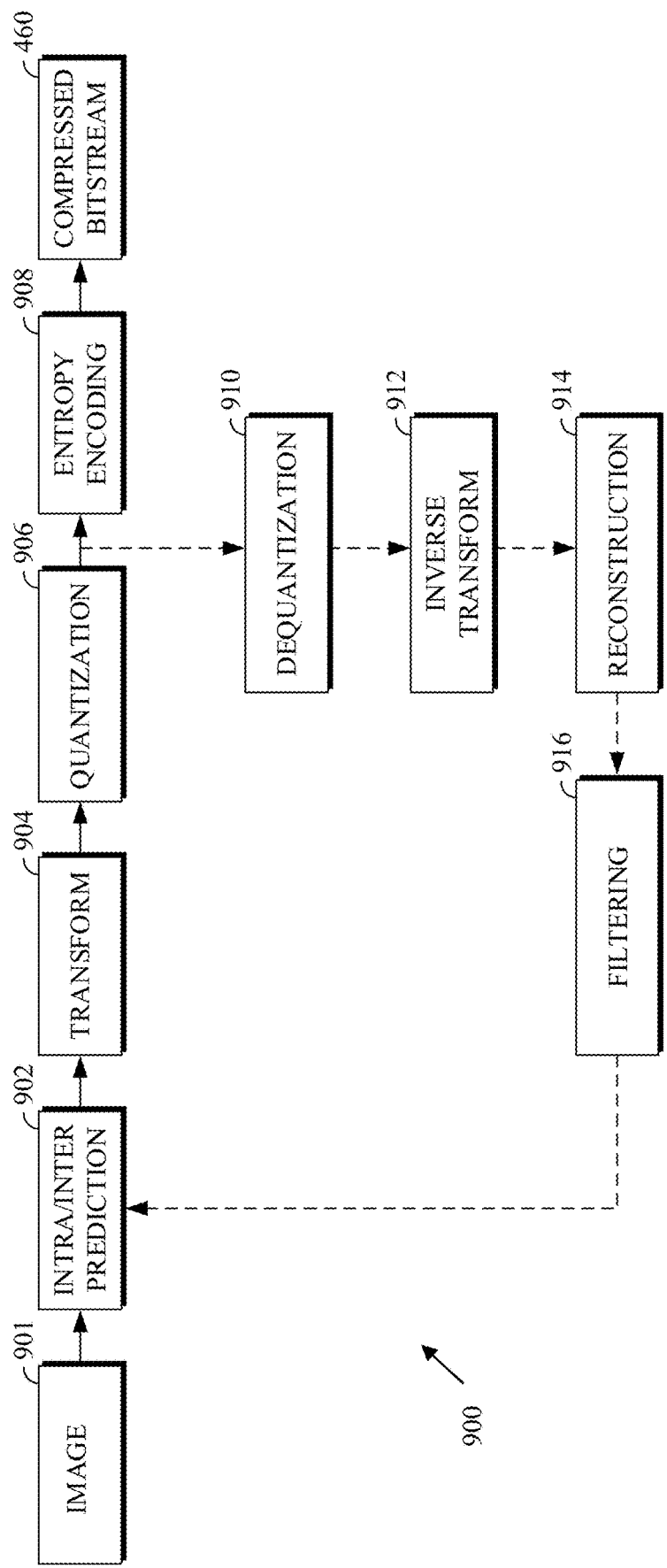
FIG. 9 is a block diagram of an encoder in accordance with implementations of this disclosure.

Turning now to FIG. 9, the encoder 900 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode image data as described herein. The encoder 900 can be implemented as specialized hardware included, for example, in computing device 100.

The encoder 900 can encode input image data 901, such as one or more denoised images generated at 440 of FIG. 4, to generate an encoded (compressed) bitstream 460. In some implementations, the encoder 900 may include a forward path for generating the compressed bitstream. The forward path may include an intra/inter prediction stage 902, a transform stage 904, a quantization stage 906, an entropy encoding stage 908, or any combination thereof. In some implementations, the encoder 900 may include a reconstruction path (indicated by the broken connection lines) to reconstruct an image for encoding of further blocks. The reconstruction path may include a dequantization stage 910, an inverse transform stage 912, a reconstruction stage 914, a filtering stage 916, or any combination thereof. Other structural variations of the encoder 900 can be used to encode denoised images 450.

For encoding the image data 901 (including a denoised image that can be as described herein), each image can be processed in units of blocks. Thus, a current block may be identified from the blocks in an image, and the current block may be encoded. Because this encoder 900 can encode multiple images forming frames of a video sequence, a denoised image being encoded and subsequently decoded is referred to as a frame in the description of the encoder 900 and the decoder 1000. It is worth noting, however, that image coding is similar except that inter prediction is generally omitted.

At the intra/inter prediction stage 902, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction stage 902 may subtract the prediction block from the current block (raw block) to produce a residual block. The transform stage 904 may perform a block-based transform, which may include transforming the residual block into transform coefficients in, for example, the frequency domain. Examples of block-based transforms include the Karhunen-Loéve Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization stage 906 may convert the transform coefficients into discrete quantum values, which may be referred to as quantized transform coefficients or quantization levels. The quantized transform coefficients can be entropy encoded by the entropy encoding stage 908 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 460. The compressed bitstream 460 can be formatted using various techniques, such as run-length encoding (RLE) and zero-run coding.

Figure 10:
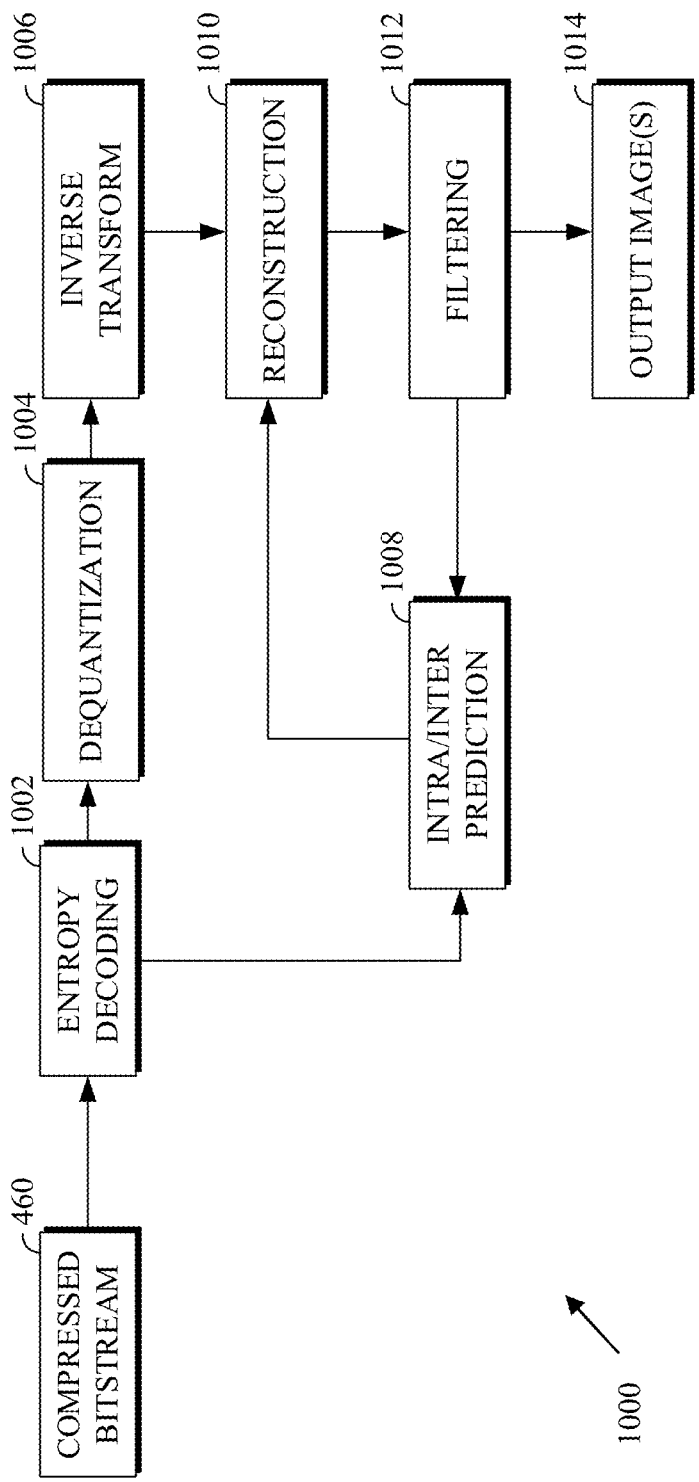
FIG. 10 is a block diagram of a decoder in accordance with implementations of this disclosure.

The reconstruction path can be used to maintain reference frame synchronization between the encoder 900 and a corresponding decoder, such as the decoder 1000 shown in FIG. 10. The reconstruction path may be similar to the decoding process discussed below and may include decoding the encoded image, or a portion thereof, which may include decoding an encoded block, which in this example includes dequantizing the quantized transform coefficients at the dequantization stage 910 and inverse transforming the dequantized transform coefficients at the inverse transform stage 912 to produce a derivative residual block. The reconstruction stage 914 may add the prediction block generated by the intra/inter prediction stage 902 to the derivative residual block to create a decoded block. The filtering stage 916 can be applied to the decoded block to generate a reconstructed block, which may reduce distortion, such as blocking artifacts. Although one filtering stage 916 is shown in FIG. 9, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line.

Other variations of the encoder 900 can be used to generate the compressed bitstream 460. For example, a non-transform-based encoder can quantize the residual block directly without the transform stage 904. In some implementations, the quantization stage 906 and the dequantization stage 910 may be combined into a single stage.

Once a denoised image is encoded at 450, the encoded denoised image may be stored or transmitted for later decoding. In this example, the compressed bitstream 460 may be decoded to reproduce one or more denoised images using a decoder at 470. The decoder is capable of decoding the bitstream in which the image data 901 (including denoised image(s) obtained at 440 of FIG. 4) are encoded. FIG. 10 is a block diagram of a decoder 1000 in accordance with implementations of this disclosure. The decoder 1000 conforms to the encoder 900, and different decoders are possible, e.g., depending upon the bitstream sent by the particular encoder used.

The decoder 1000 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 1000 can be implemented as specialized hardware included, for example, in computing device 100.

The decoder 1000 may receive a compressed bitstream, such as the compressed bitstream 460, and may decode the compressed bitstream to generate one or more output images 1014, such as a video stream. The decoder 1000 may include an entropy decoding stage 1002, a dequantization stage 1004, an inverse transform stage 1006, an intra/inter prediction stage 1008, a reconstruction stage 1010, and a filtering stage 1012. Other structural variations of the decoder 1000 can be used to decode the compressed bitstream 460.

The entropy decoding stage 1002 may decode data elements within the compressed bitstream 460 using, for example, Context Adaptive Binary Arithmetic Decoding, to produce a set of quantized transform coefficients. The dequantization stage 1004 can dequantize the quantized transform coefficients, and the inverse transform stage 1006 can inverse transform the dequantized transform coefficients to produce a derivative residual block, which may correspond to the derivative residual block generated by the inverse transform stage 912 shown in FIG. 9. Using header information decoded from the compressed bitstream 460, the intra/inter prediction stage 1008 may generate a prediction block corresponding to the prediction block created in the encoder 900. At the reconstruction stage 1010, the prediction block can be added to the derivative residual block to create a decoded block. The filtering stage 1012 can be applied to the decoded block to reduce artifacts, such as blocking artifacts, which may include loop filtering, deblocking filtering, or other types of filtering or combinations of types of filtering, and which may include generating a reconstructed block, which may be output as the output image(s) 1014.

Other variations of the decoder 1000 can be used to decode the compressed bitstream 460. For example, the decoder 1000 can produce the output image(s) 1014 without the filtering stage 1012.

Figure 12:
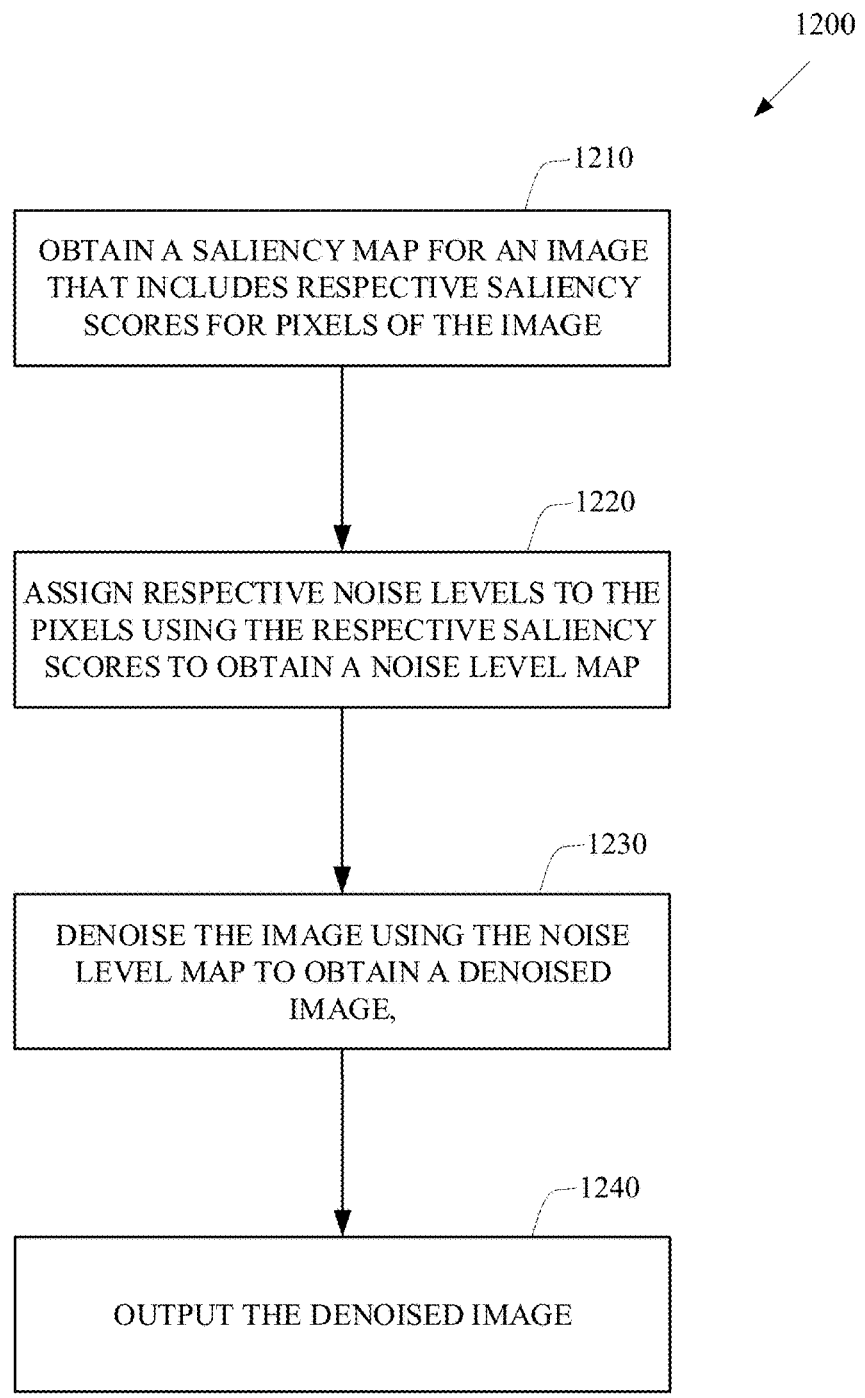
FIG. 12 is a flowchart diagram of an example of a technique for image denoising in accordance with implementations of this disclosure.

According to the foregoing, FIG. 12 is a flowchart diagram of an example of a technique 1200 for image denoising in accordance with implementations of this disclosure. The technique 1200 can be implemented in a device, such as the computing device 100 shown in FIG. 1 or the computing and communication devices 100A, 100B, 100C shown in FIG. 2. In some implementations, the technique 1200 may be implemented by a computer software program stored in a data storage unit, such as the memory 110 shown in FIG. 1. The computer software program can include machine instructions that may be executed by a processor, such as the processor 120 shown in FIG. 1, and may cause the device to process image data as described herein. In some implementations, the technique 1200 may be implemented by specialized hardware described below, or by a combination of such specialized hardware and software. In some implementations, the technique 1200 may be implemented in an encoder, such as the encoder 900 of FIG. 9, to denoise an image or blocks thereof prior to encoding the image in a compressed bitstream. In some implementations, the technique 1200 may be implemented in a decoder, such as the decoder 1000 of FIG. 10, to denoise a reconstructed image or reconstructed blocks thereof. As such, the image to be denoised by the decoder can be a reconstructed image obtained.

At 1210, a saliency map for the image may be obtained. The saliency map can be obtained as described above. As such, the saliency map can include respective saliency scores for pixels of the image. At 1220, respective noise levels can be assigned to the pixels of the image using the respective saliency scores to obtain a noise level map, as described above. As such, assigning the respective noise levels to the pixels using the respective saliency score can include evenly dividing the pixels into a predetermined number of groups of pixels based on the respective saliency scores and assigning a respective noise level to each pixel of a group of pixels. In an example, the predetermined number of groups can be 5. As described above, each group can indicate a depth level of the group of pixels in the image.

At 1230, the image is denoised using the noise level map to obtain a denoised image, as described above. As described above, the image can be denoised using a wavelet transform. The respective noise levels can be used as shrinkage thresholds such that each pixel of the image is associated with a respective shrinkage threshold. At 1240, the denoised image in output. When the technique 1200 is implemented in an encoder, outputting the denoised image can include storing or transmitting the denoised image in a compressed bitstream. When the technique 1200 is implemented in a decoder, outputting the denoised image can include outputting the denoised image to a display or to a storage device in an uncompressed form.

Other implementations of reducing noise are available. In some implementations, additional elements of noise reduction can be added, certain elements can be combined, and/or certain elements can be removed.

As used herein, the terms "optimal", "optimized", "optimization", or other forms thereof, are relative to a respective context and are not indicative of absolute theoretic optimization unless expressly specified herein.

The words "example" or "implementation" are used herein to mean serving as an example, instance, or illustration. Any aspect or design described herein as "example" or "implementation" not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 900 into an encoded video signal and transmit the encoded video signal to the communications device. In turn, the communications device can then decode the encoded video signal using a decoder 1000. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 900 may also include a decoder 1000.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for image denoising, comprising:
   obtaining a saliency map for an image, wherein the saliency map comprises respective saliency scores for pixels of the image, wherein the respective saliency scores are indicative of perceptual importance of the pixels relative to each other, and wherein the respective saliency scores are normalized to a range of [0, 1];
   assigning respective noise levels to the pixels using the respective saliency scores to obtain a noise level map;
   sorting the respective saliency scores of the noise level map to obtain a sorted list of saliency scores,
   dividing the saliency scores of the sorted list of saliency scores into a predetermined number of saliency score groups,
   generating groups of pixels corresponding to the saliency score groups;
   assigning respective noise levels to the groups of pixels, wherein a respective noise level is assigned to each pixel of a group of pixels;
   denoising the image using the noise level map to obtain a denoised image; and
   outputting the denoised image.

2. The method of claim 1, wherein the saliency scores are evenly divided into the predetermined number of the saliency score groups.

3. The method of claim 1, wherein the image is denoised using a wavelet transform.

4. The method of claim 3, wherein the respective noise levels are used as shrinkage thresholds such that each pixel of the image is associated with a respective shrinkage threshold.

5. The method of claim 1, wherein the predetermined number of saliency score groups is 5.

6. The method of claim 1, wherein outputting the denoised image comprises:
   encoding the denoised image into a compressed bitstream.

7. The method of claim 1, wherein the image is a reconstructed image obtained by a decoder.

8. A device for image denoising, comprising:
   a processor configured to:
     obtain a saliency map for an image, wherein the saliency map comprises respective saliency scores for pixels of the image, wherein the respective saliency scores are indicative of perceptual importance of the pixels relative to each other, and wherein the respective saliency scores are normalized to a range of [0, 1];
     assign respective noise levels to the pixels using the respective saliency scores to obtain a noise level map;
     sort the respective saliency scores of the noise level map to obtain a sorted list of saliency scores;
     divide the saliency scores of the sorted list of saliency scores into a predetermined number of saliency score groups;
     generate groups of pixels corresponding to the saliency score groups;
     assign respective noise levels to the groups of pixels, wherein a respective noise level is assigned to each pixel of a group of pixels;
     denoise the image using the noise level map to obtain a denoised image; and output the denoised image.

9. The device of claim 8, wherein the saliency scores are evenly divided into the predetermined number of the saliency score groups.

10. The device of claim 8, wherein the image is denoised using a wavelet transform.

11. The device of claim 10, wherein the respective noise levels are used as shrinkage thresholds such that each pixel of the image is associated with a respective shrinkage threshold.

12. The device of claim 8, wherein the predetermined number of saliency score groups is 5.

13. The device of claim 8, wherein to output the denoised image comprises to:
   encode the denoised image into a compressed bitstream.

14. The device of claim 8, wherein the image is a reconstructed image obtained by a decoder.

15. A non-transitory computer readable medium storing instructions operable to cause one or more processors to perform operations for image denoising comprising:
   obtaining a saliency map for an image, wherein the saliency map comprises respective saliency scores for pixels of the image, wherein the respective saliency scores are indicative of perceptual importance of the pixels relative to each other, and wherein the respective saliency scores are normalized to a range of [0, 1];
   assigning respective noise levels to the pixels using the respective saliency scores to obtain a noise level map;
   sorting the respective saliency scores of the noise level map to obtain a sorted list of saliency scores;
   dividing the saliency scores of the sorted list of saliency scores into a predetermined number of saliency score groups;
   generating groups of pixels corresponding to the saliency score groups,
   assigning respective noise levels to the groups of pixels, wherein a respective noise level is assigned to each pixel of a group of pixels;
   denoising the image using the noise level map to obtain a denoised image; and
   outputting the denoised image.

16. The non-transitory computer readable medium of claim 15, wherein the saliency scores are evenly divided into the predetermined number of the saliency score groups.

17. The non-transitory computer readable medium of claim 15, wherein the image is denoised using a wavelet transform.

18. The non-transitory computer readable medium of claim 17, wherein the respective noise levels are used as shrinkage thresholds such that each pixel of the image is associated with a respective shrinkage threshold.

19. The non-transitory computer readable medium of claim 15, wherein the predetermined number of saliency score groups is 5.

20. The non-transitory computer readable medium of claim 15, wherein outputting the denoised image comprises:
   encoding the denoised image into a compressed bitstream.

* * * * *